Figure 3:
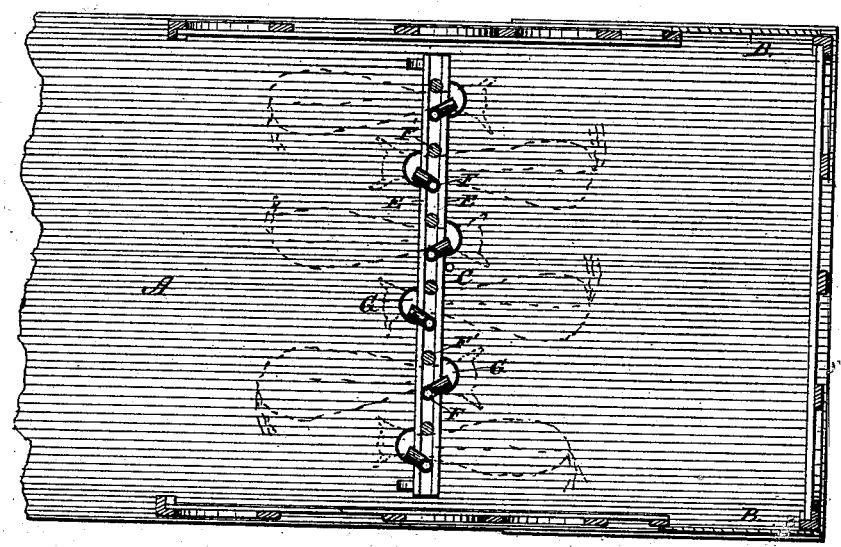

(No Model.)
2 Sheets—Sheet 1.
H. CULL.
Stock Car.
No. 241,623.  Patented May 17, 1881.
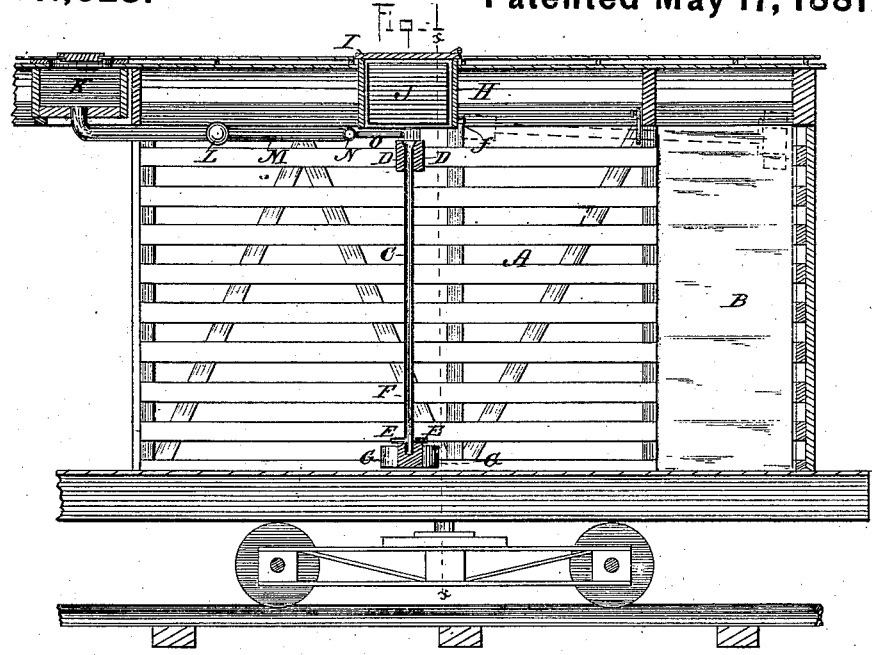
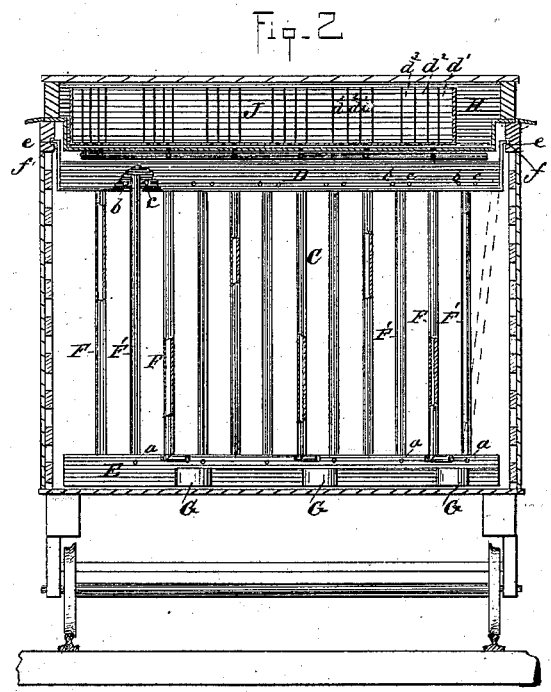
WITNESSES:
H. B. Brown
Solon C. Kemon
INVENTOR:
Henry Cull
BY Munn & Co
ATTORNEYS.

(No Model.)

2 Sheets—Sheet 2.

H. CULL.
Stock Car.

No. 241,623.

Patented May 17, 1881.

WITNESSES:

INVENTOR:
Henry Cull
BY
ATTORNEYS.

UNITED STATES PATENT OFFICE.

HENRY CULL, OF JOHNSTOWN, PENNSYLVANIA.

STOCK-CAR.

SPECIFICATION forming part of Letters Patent No. 241,623, dated May 17, 1881.

Application filed October 18, 1880. (No model.)

*To all whom it may concern:*

Be it known that I, HENRY CULL, of Johnstown, in the county of Cambria and State of Pennsylvania, have invented a new and Improved Stock-Car; and I do hereby declare that the following is a full, clear, and exact description of the same, reference being had to the accompanying drawings, forming part of this specification, in which—

Figure 1 is a vertical longitudinal section of a portion of a stock-car embodying my invention. Fig. 2 is a vertical transverse section of the car through the line $x\ x$ of Fig. 1. Fig. 3 is a horizontal section.

My invention relates to certain improvements in stock-cars designed to permit the ready feeding and watering of the animals while being transported over long railroad routes.

The invention consists in the improved method of arranging the cattle in the car and holding them in their places.

It also consists in dividing off the car by transverse partitions constructed of a series of vertical bars or stanchions, the alternate ones of which bars are in the form of hollow tubes or conduits, and providing troughs at the bottom and feeding and watering devices at the top, whereby the bars of the partition are made to act as passages for the grain or water in passing from the main supply to the several troughs below.

The invention also further consists in the peculiar arrangement of the adjustable partitions in the car, whereby they are made to move laterally and then swing up into a horizontal position beneath the top of the car whenever the cars may be required for other use.

In the drawings, A represents the body of a stock-car composed of separated bars, and having sliding doors B at its ends, and preferably, also, at its middle, through which the animals are admitted.

C represents one of a number of transverse partitions extending across the car and dividing it off into compartments. These transverse partitions are composed of two horizontal bars, D D, at the top and two corresponding bars, E E, at the bottom, between which are arranged the vertical parallel bars or stanchions F F', which are just wide enough apart to receive the necks of the animals. The alternate ones, F', of these stanchions are jointed upon a pivotal bolt, $a$, between the lower bars, E E, and at the top are held between pins $b\ c$, one of which, $c$, is removable, so as to permit the top of each stanchion F' to be swung to one side, as shown in dotted lines, Fig. 2, so as to make the space between the same and the next stanchion, F, large enough to allow the head of the animal to pass through. After the head is through the top of the stanchion is brought back and secured by the pin $c$, so as to prevent the animal's head from being withdrawn, the space between the stanchions still allowing the animal to stand or lie down at its pleasure. To give a greater amount of room to the animals thus held they are arranged alternately upon opposite sides of the partition, with their heads extended past each other, as shown in dotted lines in Fig. 3.

To permit the stock to be fed and watered I make every other one of the vertical stanchions F hollow, and at the bottom of the partition, and fastened to the horizontal bars, are arranged troughs G, corresponding to the number of animals to be connected by the partition. Into these troughs the lower ends of the hollow stanchions open and serve to conduct the food and drink from separate receptacles above. Just above each of these partitions, in the top of the car, is formed a transverse trough or box, H, having a hinged lid, I, which opens from the top of the car, and with this trough or box the upper ends of each of the hollow stanchions communicate by holes in the bottom of said trough. Within the transverse box on the top of the car is arranged a sliding feed-carrier, J, made to fit nicely in the box, and divided into feed-chambers $d'\ d^2\ d^3$, arranged in groups for each of the several hollow stanchions and troughs below. These chambers each have an opening in its bottom, which may be made to successively communicate with the upper ends of the hollow stanchions as the carrier is adjusted. The object of this arrangement is to furnish a definite number of feeds for each animal, which shall be already divided and which may be simultaneously delivered to the several animals coupled to any one partition by a single adjustment. Thus when the opening in the bottom of the first chamber, $d'$, of each group coincides with the outlet of the trough to the hollow stanchions, one feed from each group will pass by gravity down each hollow stanchion and be delivered into the trough below. When another feed is required the carrier J is adjusted so as to bring the second chamber of each group into communication with the hollow stanchions, and so on.

To permit the stock to be watered the same troughs and the same conduits are employed, and water is led from a tank, K, in the top of the car through a valve, L, and a pipe, M, which latter connects with a transverse pipe, N, having separate troughs O leading to the top of each of the hollow stanchions.

When the car is to be used for other purposes than transporting stock the partitions C are swung up into a horizontal position beneath the roof of the car, as in dotted lines in Fig. 1, and for this purpose the upper end of the partition is provided with trunnions $e\ e$, Fig. 2, which rest in grooves $f$ in the top bars of the cars, and the lower end of said partition is then suspended upon a hook. The object in suspending the trunnion of the partition in grooves is as follows: The hollow stanchions of the partition are required to fit up closely to the bottom of the transverse box or trough in the top of the car, and if the partition were turned up beneath this box or trough the thickness of the upper end of the partition would necessitate its being hung so low as to interfere with the internal capacity of the car. I therefore cause the partition to be first adjusted laterally in the groove until out of the vertical plane of the said box or trough, and then swing it up on its trunnions so that it shall not project sensibly below the bottom level of the feed-box.

I am aware of the fact that stock-cars have been constructed with transverse partitions formed by adjustable stanchions for receiving and holding the necks of the cattle; but I do not know that these bars or stanchions have ever been made hollow and utilized for the double purpose of conduits for the grain and a separating-partition.

In so far as my method of arranging the cattle is concerned, I would also say that I do not claim arranging the cattle heads and tails, as this has been attempted before, and is impracticable for the reason that it brings the litter of one animal close to the feed devices of his neighbor. My method consists in arranging the two sets of animals to face in opposite direction, with just their heads and necks lapping past each other, and retaining them there by a common connection or partition, as shown.

The advantages of this are that the length of the animal is parallel with the longitudinal axis of the car, which enables the animals to brace themselves against the endwise jerks of the car. Again, this arrangement brings the feed ends of two rows of cattle together and removes the litter end of two rows to a similar coincidence. A more important and distinctive advantage still is that it frequently happens that one, at least, of the animals in a car gets unruly, and when they are all arranged on one side of a holding-partition the unruly animal excites his neighbors, and as they then all pull in one direction the cumulative strain is liable to pull out the partition. With the partition forming a common connection for the heads of the two alternately-facing rows it will be seen that if one animal is unruly he excites his neighbors on the other side of the partition, and the pulling strain of one on one side of the partition is counteracted by the strain of the others on the other side, and the partition is not detached from its fastenings.

Having thus described my invention, what I claim as new is—

1. A stock-car having a transverse partition formed of vertical bars or stanchions, a portion of which are made hollow to form conduits for food and drink, as described.

2. The combination, with a stock-car, of one or more transverse partitions made with vertical parallel bars or stanchions, a portion of which are hollow, a set of troughs at the bottom of said partitions, and receptacles for food and drink located at the top of the car, as described.

3. The combination, with the partitions C, having conduits therein, of a box or trough located on the top of the car, with openings in its bottom, and an adjustable carrier for the feed, having grouped compartments with openings in the bottom, substantially as described.

4. The combination, with the stock-car having feed-box in its top portion, of the partitions C, hung at their upper ends on trunnions, which trunnions have a lateral adjustment to permit the partition to be moved bodily to one side before being hung up, as described.

5. The method of arranging cattle in a stock-car, which consists in placing two rows of them together with their heads facing in opposite direction and lapped past each other, as described, and retaining them in this position by a common connection, as shown and described.

HENRY CULL.

Witnesses:
CHAS. A. PETTIT,
SOLON C. KEMON.